US011333271B2

(12) United States Patent
Iwaniuk et al.

(10) Patent No.: US 11,333,271 B2
(45) Date of Patent: May 17, 2022

(54) QUICK COUPLING FUEL TRANSFER

(71) Applicant: SAFRAN AEROSYSTEMS, Plaisir (FR)

(72) Inventors: Mathieu Iwaniuk, Caudebec-les-Elbeuf (FR); Sébastien Gouel, Caudebec-les-Elbeuf (FR); Philippe Bulard, Caudebec-les-Elbeuf (FR); Christophe Mendes, Caudebec-les-Elbeuf (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 154 days.

(21) Appl. No.: 16/788,960

(22) Filed: Feb. 12, 2020

(65) Prior Publication Data
US 2020/0256492 A1 Aug. 13, 2020

(30) Foreign Application Priority Data

Feb. 13, 2019 (FR) ...................................... 1901463

(51) Int. Cl.
*F16L 5/02* (2006.01)
*F16L 37/084* (2006.01)
(Continued)

(52) U.S. Cl.
CPC ............... *F16L 5/025* (2013.01); *F16L 5/027* (2013.01); *F16L 37/084* (2013.01);
(Continued)

(58) Field of Classification Search
CPC ......... F16L 5/025; F16L 5/027; F16L 37/107; F16L 37/248; F16L 37/505; F16L 27/1273
(Continued)

(56) References Cited

U.S. PATENT DOCUMENTS 3,596,936 A * 8/1971 Dieckmann ........... F16L 37/252
10,344,895 B2 * 7/2019 Bocker
(Continued)

FOREIGN PATENT DOCUMENTS

FR 1 526 167 A 5/1968
FR 3 012 441 A1 5/2015
(Continued)

OTHER PUBLICATIONS

French Preliminary Report issued in French Application No. 1901463, dated Sep. 26, 2019 (2 pages).

*Primary Examiner* — Zachary T Dragicevich
(74) *Attorney, Agent, or Firm* — Rothwell, Figg, Ernst & Manbeck, P.C.

(57) ABSTRACT

Quick coupling device 1 for transferring liquid for an aircraft, comprising a female member 7 configured to be connected to a first reservoir, said female member 7 forming a passage and comprising a cylindrical portion 13 and a radial portion 14, a male member 2 configured to be connected to a second reservoir, said male member 2 forming a passage, slidably mounted in a liquid-tight manner in the female member 7 and comprising a cylindrical portion 3 and a radial portion 4, and a member 40 for locking the male member 2 in the female member 7, the locking member 40 being disposed between the radial portion 14 of the female member 7 and the radial portion 4 of the male member 2, the locking member 40 surrounding the male member 2 and leaving a limited sliding extent for the male member 2 with respect to the female member 7, engaging with the female member 7 in the locked position and releasing the female member 7 in the unlocked position, the locking member 40 comprising an axial blocking lock that can be actuated by an axial then rotating movement and that can be released by an (Continued)

axial then rotating movement, and a rotation brake, the lock and the brake being active in the locked position.

9 Claims, 7 Drawing Sheets

(51) Int. Cl.
    *F16L 37/50*     (2006.01)
    *F16L 37/248*     (2006.01)
    *F16L 37/107*     (2006.01)

(52) U.S. Cl.
    CPC ............ F16L 37/107 (2013.01); F16L 37/248 (2013.01); F16L 37/505 (2013.01)

(58) Field of Classification Search
    USPC ........................................ 285/361, 396, 402
    See application file for complete search history.

(56) References Cited

U.S. PATENT DOCUMENTS

2003/0107218 A1*   6/2003   Anderson ............. F16L 37/107
                                                                285/360
2017/0030499 A1*   2/2017   Flynn .................... F16L 37/505

FOREIGN PATENT DOCUMENTS

FR          3 016 950 A1     7/2015
WO         2017157526 A1     9/2017

* cited by examiner

QUICK COUPLING FUEL TRANSFER

CROSS REFERENCE TO RELATED APPLICATION

This application claims priority to French Application No. FR 1901463, filed Feb. 13, 2019, "Raccord rapide de transfert de carburant" the contents of which are incorporated herein by reference.

FIELD OF THE DISCLOSURE

The invention relates to the field of supplying fuel to an aircraft.

BACKGROUND

A liquid fuel aircraft, plane, helicopter or similar comprises at least one permanently installed reservoir. The reservoir can be located under the seats of an aircraft for transporting passengers. When extended autonomy is desired, use is made of an additional reservoir. The additional reservoir can be mounted in the place of a passenger seat removed beforehand.

SUMMARY

There is a need to fluidically and mechanically connect an additional reservoir and a permanently installed reservoir. The fluidic connection makes it possible to transfer fuel from the permanently installed reservoir to the additional reservoir for refuelling and from the additional reservoir to the permanently installed reservoir during the operation of the motorisation. The filling operation is therefore the same in the presence and in the absence of the additional reservoir. The filling operation can be carried out via an external louver of the aircraft. In other terms, the fluidic connection makes it possible to render the additional reservoir transparent during refuelling, while still offering a larger quantity of on-board fuel. The additional reservoir, such as it is known in prior art, can be dismounted. The dismounting is carried out by opening a panel to access the inside of the reservoir, then by releasing fastening members inside the reservoir.

Therefore, a purpose of the invention is a robust device, of low weight, limited size, and fast mounting and dismounting.

The invention proposes a quick coupling device for transferring liquid in an aircraft, comprising a female member configured to be connected to a first reservoir, said female member forming a passage and comprising a cylindrical portion and a radial portion, a male member configured to be connected to a second reservoir, said male member forming a passage, slidably mounted in a liquid-tight manner in the female member and comprising a cylindrical portion and a radial portion, and a member for locking the male member in the female member, the locking member being disposed between the radial portion of the female member and the radial portion of the male member, the locking member surrounding the male member and leaving a limited sliding extent for the male member with respect to the female member, engaging with the female member in the locked position and releasing the female member in the unlocked position, the locking member comprising an axial blocking lock that can be actuated by an axial then rotating movement and that can be released by an axial then rotating movement, and a rotation brake, the lock and the brake being active in the locked position.

The device offers an axial clearance that is substantial and independent from the locking in that identical locking members can be implemented with female and male members of different sliding lengths. The device is free from the transmission of forces in case of a strong vertical acceleration beyond a threshold chosen according to the current standards. In an embodiment, the female member comprises two concentric rings integral with the radial portion of the female member. The first ring is provided with a plurality of L-shaped grooves configured to cooperate with the lock. The second ring is provided with a first concavity extending axially over the height of said second ring for the engagement of the brake and of a second concavity angularly offset with respect to the first concavity and configured to cooperate with the brake in the locked position. The female member is compact.

In an embodiment, each L-shaped groove comprises an axial portion arranged on a portion of the thickness of the first ring, an angular portion arranged on a limited angular sector of the first ring, and a projection directed towards the radial portion of the female member, in the vicinity of the axial portion and delimiting the locked position of the lock. The angular course is low, providing quick manoeuvring.

In an embodiment, the L-shaped grooves are disposed angularly in an irregular manner. A single annular locking position is created.

In an embodiment, one of the rings is external and provided with radial openings in the vicinity of the radial portion of the female member. A removal of the condensation water is obtained.

In an embodiment, an axial-effect spring of a generally annular shape is disposed between said concentric rings to exert an axial prestress on the locking member in the locked position. The locking is stable.

In an embodiment, said spring is undulated and comprises several windings. Said spring is compact.

In an embodiment, the locking member comprises an axial skirt supporting the axial blocking lock. The axial blocking lock comprises a plurality of teeth directed towards the female member. The teeth are concentric. Each tooth forms an angular sector. Each tooth has edges that are part of parallel planes.

In an embodiment, the locking member is made from at least two portions.

In an embodiment, the brake comprises a spring, annular or as an arc of a circle, having a boss directed radially outwards and configured to interfere with the female member, more particularly with a concavity arranged in the female member. A double safety is obtained.

The invention also proposes a fuel reservoir provided with the male portion or with the female portion of the quick coupling device for transferring liquid in an aircraft.

Thus, according to an aspect of the invention, a reservoir is provided with a quick coupling device for transferring liquid in an aircraft, comprising a female member connected to said reservoir, said female member forming a passage and comprising a cylindrical portion and a radial portion, a male member configured to be connected to a second reservoir, said male member forming a passage, configured to be slidably mounted in a liquid-tight manner in the female member and comprising a cylindrical portion and a radial portion, and a member for locking the male member in the female member, the locking member being configured to be disposed between the radial portion of the female member and the radial portion of the male member, the locking member being configured to surround the male member and leave a limited sliding extent for the male member with respect to the female member, engaging with the female member in the locked position and releasing the female member in the unlocked position, the locking member comprising an axial blocking lock that can be actuated by an axial then rotating movement and that can be released by an axial then rotating movement, and a rotation brake, the lock and the brake being active in the locked position.

Thus, according to an aspect of the invention, a reservoir is provided with a quick coupling device for transferring liquid in an aircraft, comprising a female member configured to be connected to another reservoir, said female member forming a passage and comprising a cylindrical portion and a radial portion, a male member configured to be connected to said reservoir, said male member forming a passage, configured to be slidably mounted in a liquid-tight manner in the female member and comprising a cylindrical portion and a radial portion, and a member for locking the male member in the female member, the locking member being configured to be disposed between the radial portion of the female member and the radial portion of the male member, the locking member being configured to surround the male member and leave a limited sliding extent for the male member with respect to the female member, engaging with the female member in the locked position and releasing the female member in the unlocked position, the locking member comprising an axial blocking lock that can be actuated by an axial then rotating movement and that can be released by an axial then rotating movement, and a rotation brake, the lock and the brake being active in the locked position.

The invention also proposes an aircraft provided with a quick coupling device for transferring liquid in an aircraft, comprising a female member configured to be connected to a first reservoir of the aircraft, said female member forming a passage and comprising a cylindrical portion and a radial portion, a male member configured to be connected to a second reservoir of the aircraft, said male member forming a passage, slidably mounted in a liquid-tight manner in the female member and comprising a cylindrical portion and a radial portion, and a member for locking the male member in the female member, the locking member being disposed between the radial portion of the female member and the radial portion of the male member, the locking member surrounding the male member and leaving a limited sliding extent for the male member with respect to the female member, engaging with the female member in the locked position and releasing the female member in the unlocked position, the locking member comprising an axial blocking lock that can be actuated by an axial then rotating movement and that can be released by an axial then rotating movement, and a rotation brake, the lock and the brake being active in the locked position.

BRIEF DESCRIPTION OF THE DRAWINGS

Other characteristics and advantages of the invention shall appear when examining the detailed description hereinafter, and accompanying drawings, wherein.

Figure 1:
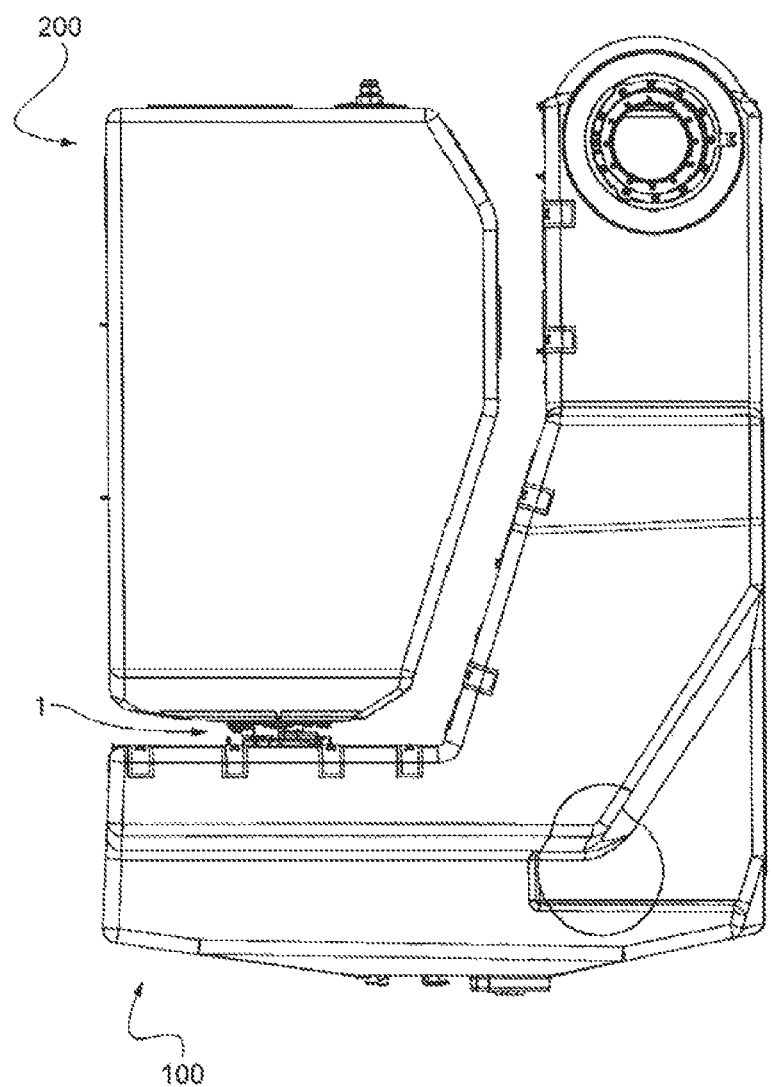
FIG. 1 diagrammatically shows, an example of a coupling between two fuel reservoirs, FIG. 2 diagrammatically shows, in an elevated front view, a coupling according to an aspect of the invention, FIG. 3 diagrammatically shows in an axial cross-section view, the coupling of FIG. 2, FIG. 4 diagrammatically shows in a perspective view, the female portion of the coupling of FIG. 2, external ring dismounted, FIG. 5 diagrammatically shows in a perspective view, the female portion of the coupling of FIG. 2, external ring mounted, FIG. 6 diagrammatically shows, in an elevated top view, the coupling of FIG. 2, FIG. 7 diagrammatically shows in a perspective view, the coupling of FIG. 2.

The accompanying drawings can not only be used to supplement the invention, but also contribute to the definition thereof, where applicable.

DETAILED DESCRIPTION

A purpose of the invention is to allow for the installation and the removal of an additional reservoir in an aircraft, in particular a helicopter. An aircraft comprises one or several fixed reservoirs of fluid for the storage of fuel, oil or water. For certain missions of the aircraft, it is desirable to increase the on-board quantity of one of the fluids. This need is particularly the case for rotary-wing aircraft of which the flight autonomy or the distance that can be crossed is clearly lower than for fixed-wing aircraft. Thus, an unoccupied seat or a freight space left free can be used for an additional reservoir. This is very useful for missions of long length for example for maritime surveillance or of long distance, for example a transit with a zero or partial load. There is a need to quickly mount and dismount an additional removable reservoir, with the dismounting being carried out on the exterior of the additional removable reservoir.

A mechanical connection transfers the forces exerted by the additional reservoir to the permanently installed reservoir, in particular the weight and the forces generated by the acceleration of the aircraft. In particular in case of a falling of the aircraft with percussion on the ground, the mechanical connection of the additional reservoir is subjected to substantial forces. IT is desirable that the fluidic connection remains intact under severe stresses.

As can be seen in the figures, the coupling 1 is provided to be assembled to the fixed reservoir 100 or to a fluid conduit on one side and to the removable reservoir 200 on the other side. For this purpose, the coupling 1 comprises a portion that is permanently fastened to the fixed reservoir or to a fluid conduit and a portion that is permanently fastened to the removable reservoir. Here, permanently fastened means a fastening that can be dismounted for maintenance and remains in the fastened state under normal use of the aircraft, in particular during the preparation thereof for a mission with the adding or removal of the removable reservoir. The two portions of the coupling 1 are provided to create together in the mounted state a passage for fluid from one end to another of the coupling 1, the passage being tight. The coupling 1 has an axis of symmetry.

The coupling 1 comprises a male member 2 with a general shape of revolution. The male member 2 comprises a cylindrical portion 3 and a radial portion 4. The axial cross-section of the male member 2 has an L shape. The radial portion 4 forms a collar extending outwards from an end of the cylindrical portion 3. The radial portion 4 is provided to be fastened to one of the reservoirs—fixed or removable. The radial portion 4 can be provided with holes for fastening by screw-nut to said reservoir. The cylindrical portion 3 has an annular bore. The cylindrical portion 3 has on its external surface a bulge 5 formed in the vicinity of the free end opposite the radial portion 4. The bulge 5 protrudes outwards. At least one annular groove 6 is arranged in said bulge 5. The bulge 5 carries at least one O-ring housed in each groove 6. The O-ring is configured to cooperate with a bore of another portion of the coupling, or a female member.

The male member 2 forms a fluid passage. The male member 2 is configured to be slidably mounted in a liquid-tight manner in the female member. The bulge 5 serves as an axial anti-separation abutment in one direction. The radial portion 4 serves as an axial anti-sinking abutment in the other direction.

The coupling 1 comprises a female member 7. The female member 7 comprises a cylindrical portion 13, a radial portion 14 and a retaining portion 15. The axial cross-section of the cylindrical portion 13 and of the radial portion 14 is in the shape of an L. The radial portion 14 forms a collar extending outwards from an end of the cylindrical portion 13. The radial portion 14 is provided to be fastened to the other of the reservoirs—removable or fixed. The radial portion 14 can be provided with holes for screw-nut fastening to said other reservoir. The cylindrical portion 13 has an annular bore. The cylindrical portion 13 has a bulge 12 formed in the vicinity of the free end opposite the radial portion 14. The bulge 12 protrudes inwards. The bulge 12 can form an axial abutment. The bulge 12 reinforces the free end of the cylindrical portion 13. The bulge 12 is annular in the embodiment shown. The female member 7 is during normal use connected to the other of the reservoirs. The female member 7 forms a fluid passage.

The retaining portion 15 is formed as an axial protrusion from the radial portion 14 opposite the cylindrical portion 13. The retaining portion 15 has an annular geometric envelope with a rectangular section flush with the bore of the cylindrical portion 13. In practice, the bore of the cylindrical portion 13 and the bore of the female member 7 are confounded.

The retaining portion 15 comprises an internal ring 16 and an external ring 17. The forms and the functions of the internal 16 and external 17 rings can be interchanged.

The external ring 17, in the embodiment shown, is a part separate from the radial portion 14. The external ring 17 is fastened in a removable manner to the radial portion 14, for example by screwing. The external ring 17 forms with a radial annular ring 11, an annular part with an inverted T section. The external ring 17 and the radial annular ring 11 are of a single piece. The radial annular ring 11 is in contact with a radial surface of the radial portion 14. The radial annular ring 11 is fastened in a removable manner to the radial portion 14, for example by screwing. The radial annular ring 11 has a diameter less than the diameter of the radial portion 14. The radial portion 14 can be provided with an annular groove for a seal. The annular groove is arranged from the surface of the radial portion 14 located on the side of the radial annular ring 11 and between the radial annular ring 11 and the free edge of the radial portion 14.

The internal ring 16 has an internal surface formed by the bore of the female member 7, an external surface 18 and a front surface 19. The front surface 19 is normal to the axis. A chamfer can be arranged between the front surface 19 and the internal surface. A plurality of notches 20, four in the embodiment shown, are arranged in the front surface 19. The notches 20 occupy angular sectors of which at least one is different from the others or of which the distribution is unequal. The notches 20 are delimited by surfaces that pass through the axis of the internal ring 16, also axis of the coupling 1 in general.

The notches 20 are tiered into two internal and external portions. The internal portion 21 is arranged on a small portion of the height of the internal ring 16, for example 20 to 30%. The external portion 22 is arranged on a major portion of the height of the internal ring 16, for example 80 to 90%. The internal portion 21 has a radial dimension less than the radial dimension of the external portion 22. In other terms, the internal ring 16 has a section, as an axial cross-section in line with the notches 20, as a staircase. The internal ring 16 has, starting from the radial portion 14, a zone of full thickness, then a zone of reduced thickness separated from the zone of full thickness by a planar radial step 23. The zone of reduced thickness is terminated by an upper surface that joins the internal surface formed by the bore of the female member 7.

From the external surface 18, are arranged grooves 24. Each groove 24 joins one of the notches 20. The grooves 24 are all disposed on the same side of the notches 20, on the left or on the right. The section of the grooves 24 as an axial cross-section is rectangular. The internal surface 25 of the grooves 24 is coplanar and in the extension of the steps 23. The upper surface 26 of the grooves 24 is generally parallel to the internal surface 25. The upper surface 26 of the grooves 24 has a protrusion 27 directed downwards in the vicinity of the corresponding notch 20. Angularly, each groove 24 opens into one of the notches 20 at one end and is closed at the opposite end in the vicinity of another of the notches 20. The bottom of the grooves 24 is annular, coaxial to the edge of the zone of reduced thickness of the notches 20 and of the same radius. A groove 24 and a notch 20 have an L shape.

The external ring 17 has an internal surface 28 disposed facing the external surface 18 of the internal ring 16, an external surface 29 and a front surface 30. The front surface 30 is normal to the axis. The external surface 29 is cylindrical of revolution. The internal ring 28 has two recesses 31 and 32 extending axially over the height of the external ring 17 and angularly over two neighbouring and separate angular sectors. The recesses 31 and 32 can be separated by about 3 to 10°. Other than the recesses 31 and 32, the internal surface 28 is cylindrical of revolution.

A plurality of slots 33 are arranged in the external ring 17. The slots 33 extend axially from the free end of the external ring 17 to the radial portion 14. The slots 33 are straight. The slots 33 are provided with edges parallel to the axis of the coupling 1. The slots 33 provide a removal of water in case of condensation or of penetration of water between the internal 16 and external 17 rings. Alternatively, the slots 33 are replaced with holes that pass through the external ring 17 in the vicinity of the radial portion 14.

Between the internal 16 and external 17 rings, the female member 7 has an annular surface 34 normal to the axis of the coupling 1. The annular surface 34 is radial. The annular surface 34 is formed by the radial annular ring 11. On the annular surface 34, is positioned a spring 35. The spring 35 is undulated. The spring 35 has many windings. The spring 35 is maintained by the internal 16 and external 17 rings.

Around the cylindrical portion 3 of the male member 2, is mounted a member 40 for locking the male member 2 in the female member 3. The locking member 40 has a lower inner diameter comprised between the outer diameter of the cylindrical portion 3 and the outer diameter of the bulge 5. Thus, in the mounted state, the locking member 40 is subjected to the male member 2 with limited angular freedom and axial freedom. The locking member 40 is carried out in several angular portions assembled by screwing in order to allow for mounting on the cylindrical portion 3.

The locking member 40 has a radial collar 41 and a cylindrical skirt 42 extending from the inside edge of the radial collar 41, from one side of the radial collar 41. The locking member 40 has a T-shaped section, with the radial collar 41 slightly overextending from the cylindrical skirt 42 inwards. The radial collar 41 is provided with reliefs in order to facilitate the grasping thereof by an operator. The radial collar 41 can abut against the radial portion 4 of the male member 2. The inside edge of the radial collar 41 can abut against the bulge 5 of the male member 2.

Figure 2:
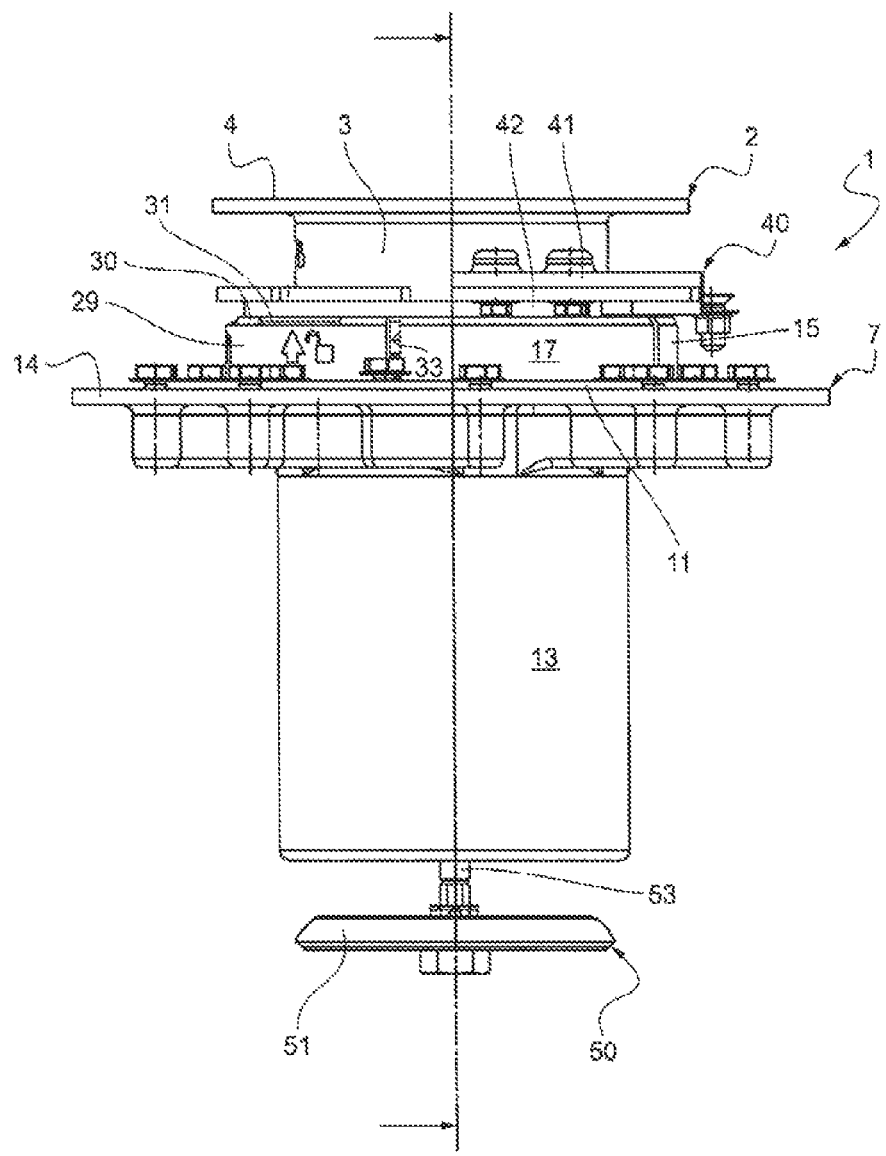
Figure 3:
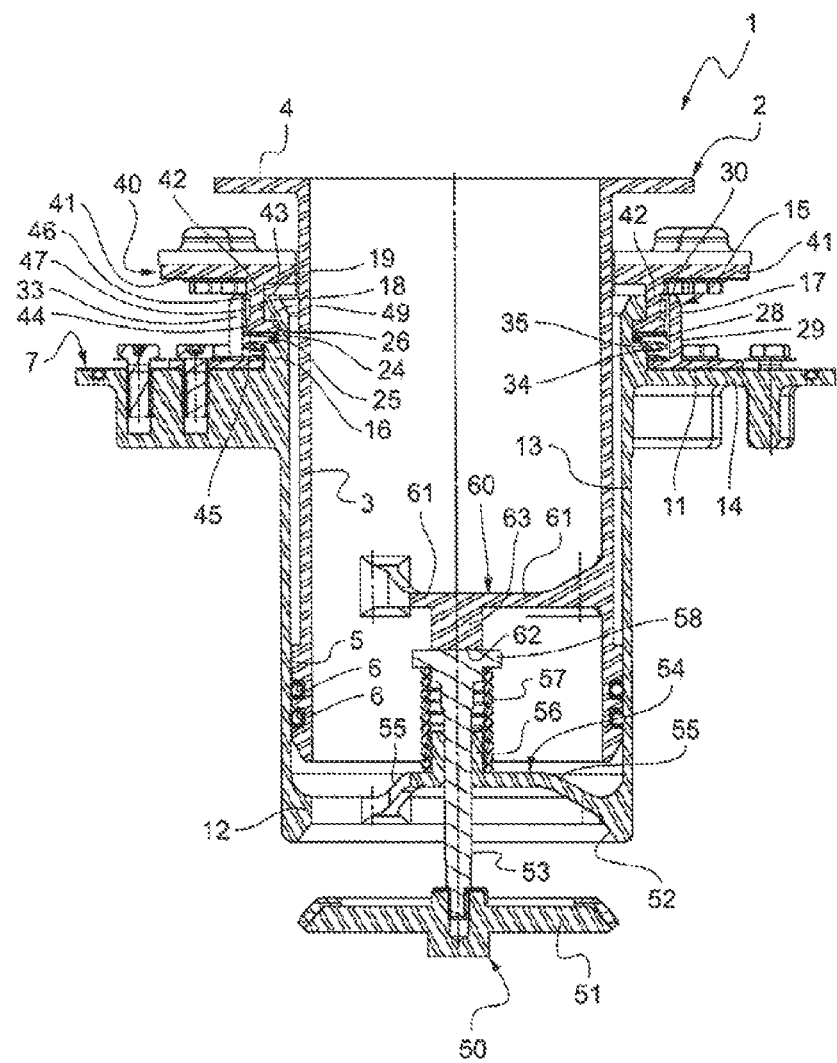
Figure 4:
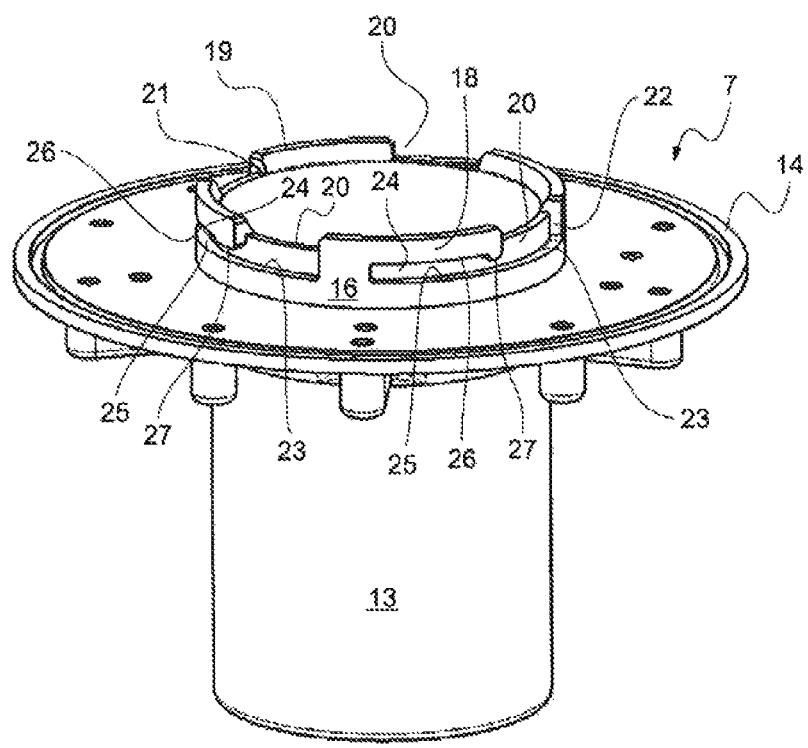
Figure 5:
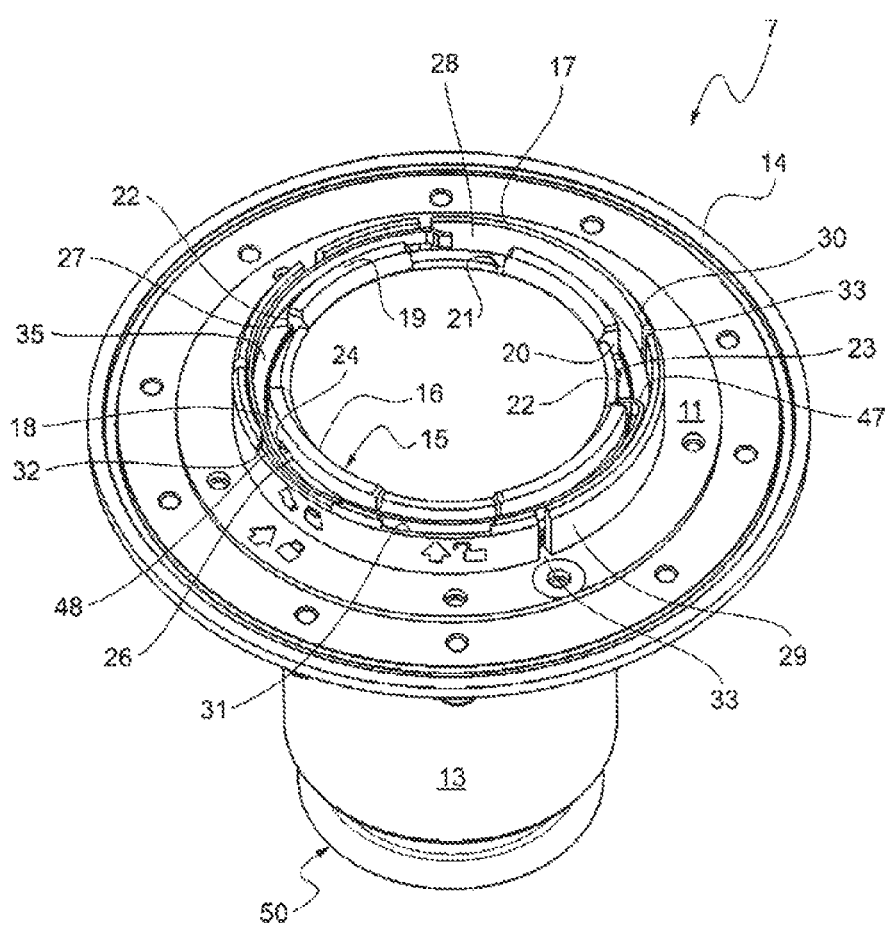
Figure 6:
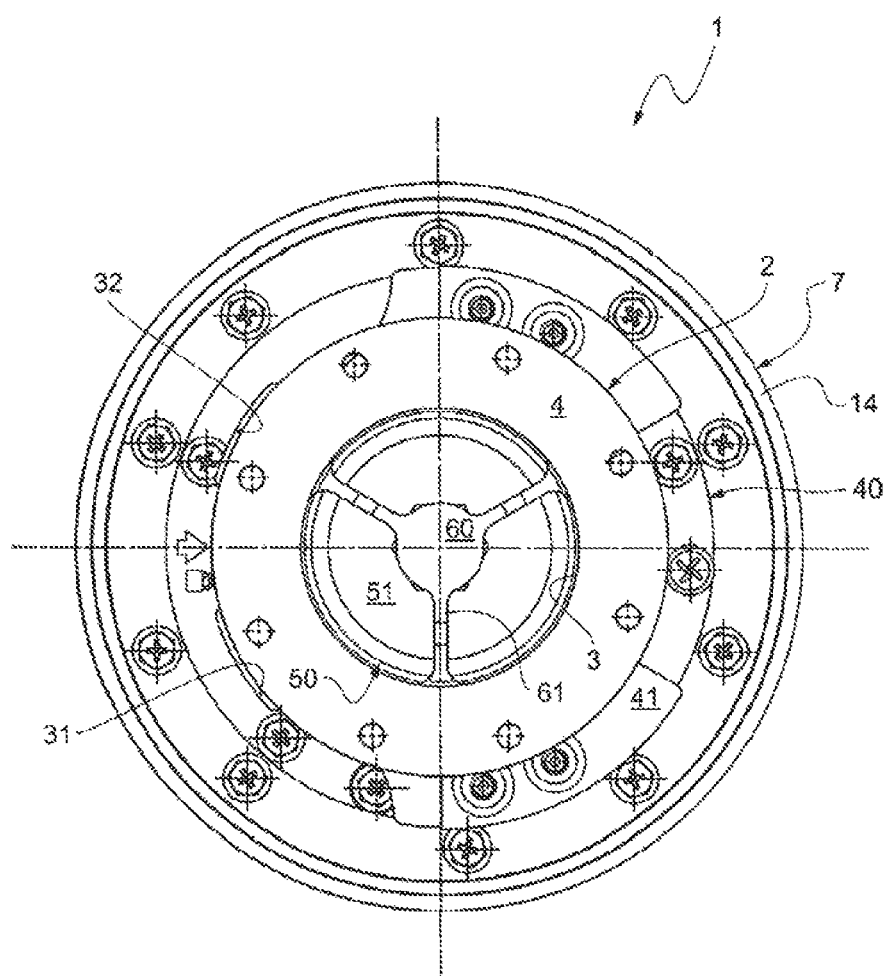
Figure 7:
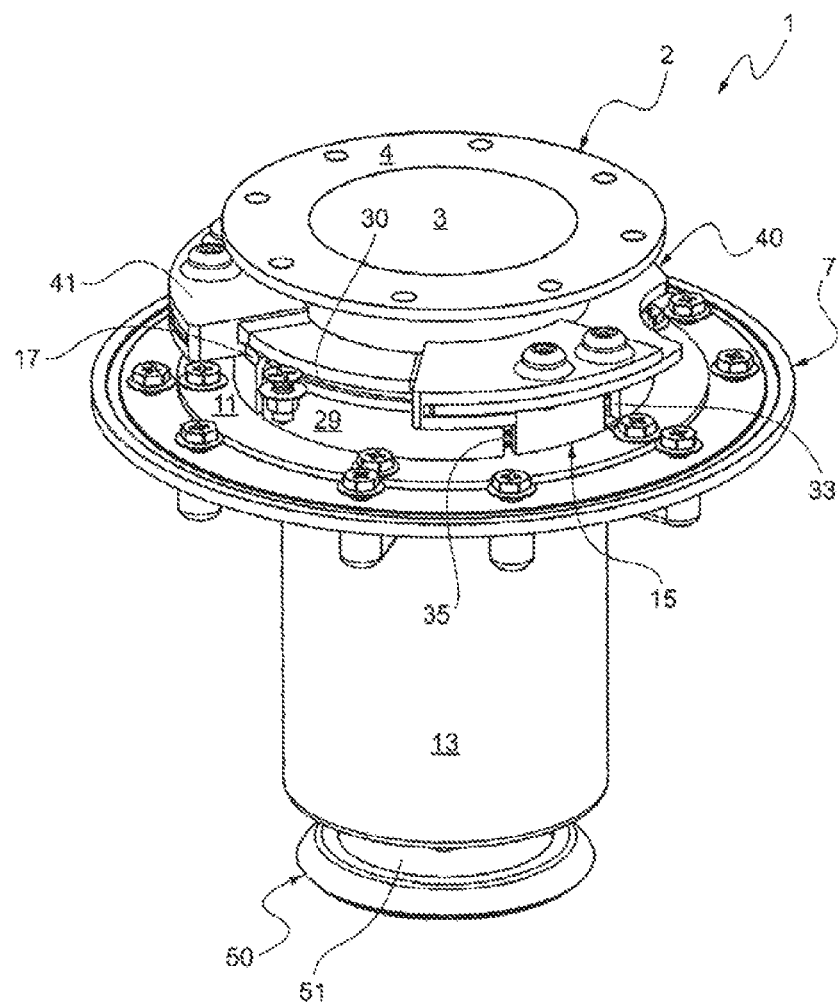

The locking member 40 is carried out in several angular portions. Each angular portion can comprise a portion of radial collar 41 and a portion of cylindrical skirt 42. Each angular portion has a lateral opening that is sufficient for the mounting around the cylindrical portion 3 or skirt of the male member 2. The angular portions are fastened together in a removable manner, for example by screwing of superimposed radial sectors, cf. FIGS. 2, 3, 6 and 7.

The cylindrical skirt 42 is configured to be housed between the internal ring 16 and the external ring 17 during the locking. The cylindrical skirt 42 has an internal surface 43, an external surface 44, and a terminal surface 45. The internal surface 43 has a cylinder of revolution shape. The terminal surface 45 is planar. The terminal surface 45 is parallel to the radial collar 41. The terminal surface 45 is normal to the axis of the coupling 1. The terminal surface 45 is opposite the annular surface 34. The terminal surface 45 receives the bearing of the spring 35 at the end of said spring 35 opposite the annular surface 34. The spring 35 tend to separate the terminal surface 45 and the annular surface 34, therefore to separate the locking member 40 and the female member 7 from one another.

The external surface 44 is formed with a groove 46 arranged on a limited angular sector. The groove 46 has parallel edges, for example normal to the axis of the coupling 1. The groove 46 has a bottom with shallow depth. In the groove 46 is housed a leaf spring 47. The spring 47 is retained by its ends. The spring 47 has a boss 48 projecting radially outside the groove 46. The boss 48 occupies an angular sector less than the angular sector occupied by each recess 31, 32. The boss 48 has an axial dimension with respect to the external surface 44 less than the depth of each recess 31, 32. Thus, the boss 48 is configured to enter into one of the recesses 31 and 32 during an axial movement, then to protrude in the other of the recesses 32 and 31 after a rotation. The spring 47 forms an angular brake, cooperating with the recesses in the embodiment shown. Alternatively, the spring 47 can cooperate with protuberances that form recesses between them.

The locking member 40 comprises a lock in the form of a plurality of teeth 49 protruding inwards from the internal surface 43. The teeth 49 have an edge coplanar with the terminal surface 45. The teeth 49 have an opposite edge located facing the radial collar 41. Said opposite edge is located in a plane parallel to the radial collar 41. Said opposite edge interferes, in the locked state, with the upper edge of the grooves 24 under the stress of the spring 35.

The teeth 49 have internal surfaces as arcs of a circle with the same centre and radius. Said internal surfaces are of a diameter greater than the inner diameter of the radial collar 41. Said internal surfaces are of a diameter greater than the diameter of the bottom of the grooves 24. The teeth 49 have end surfaces located in planes that pass through the axis of the coupling 1.

The teeth 49 occupy separate angular sectors. The teeth 49 occupy angular sectors that correspond to the angular sectors of the notches 20. Thus, each tooth 49 corresponds to a notch 20 to the nearest tolerances in such a way that each tooth 49 is able to enter into the corresponding notch 20 via an axial movement.

Simultaneously to the penetration of the teeth 49 into the notches 20, the boss 48 of the spring 47 enters into one of the recesses 31 and 32. During the relative axial movement of the locking member with respect to the female member 7, the spring 35 is compressed. Then a rotation is applied by maintaining an axial force against the spring 35. Each tooth 49 passes from the corresponding notch 20 to one of the grooves 24, by scrolling under the protrusion 27. The boss 48 is radially compressed inwards by the internal surface 28 of the external ring 17.

At the end of the rotation movement, each tooth 49 has crossed the protrusion 27. The boss 48 tends to return to its initial form, the spring 47 releasing the other of the recesses 32 and 31. The axial force against the spring 35 is stopped. The release of the spring 35 pushes the teeth 49 against the upper surface 26 of the grooves 24. A rotation in reverse is prevented by the protrusion 27 of each groove 24.

Thus, the locking member 40 comprises an axial blocking lock that can be actuated by an axial then rotating movement and that can be released by an axial then rotating movement, and a rotation brake, the lock and the brake being active in the locked position. The springs 35 and 47 form a double safety.

The coupling 1 comprises a shut-off valve 50 mounted in the female member 7. The shut-off valve 50 is slidably mounted with respect to the female member 7, the sliding being according to the axis of the coupling 1. The shut-off valve 50 comprises a circular shutter 51 configured to come into tight contact with a seat 52 arranged in the vicinity of the bulge 12. The seat 52 can have the form of a chamfer formed between a bore of the bulge 12 and the free end of the cylindrical portion 13 of the female member 7. The shut-off valve 50 comprises a control and retaining rod 53 integral with the circular shutter 51. The control and retaining rod 53 is protruding in the bore of the cylindrical portion 13. The control and retaining rod 53 has an end fastened to the circular shutter 51 and an end in the form of a collar 58. The shut-off valve 50 has a closed-off position wherein the bore of the cylindrical portion 13 of the female member 7 is closed, and an open position.

The female member 7 comprises a support 54 for the shut-off valve 50. The support 54 comprises at least one, for example three, arms 55 and a central tubular sleeve 56. The tubular sleeve 56 is coaxial to the cylindrical portion 13 of the female member 7. The arm(s) 55 extend radially between the tubular sleeve 56 and the bulge 12 and leave free a fluid passage in the axial direction. The control and retaining rod 53 is of a diameter suitable for being displaced in the bore of the tubular sleeve 56. A spring 57 is mounted around the control and retaining rod 53 and around the tubular sleeve 56. The spring 57 tends to close the shut-off valve 50. The spring 57 is, here, bearing on one side on the arm(s) 55 or on a collar disposed between the arm(s) 55 and the tubular sleeve 56 and on the other side on the collar 58. The spring 57 exerts a permanent force on the control and retaining rod 53, in the closed-off position and in the open position. The support 54 is of a single piece with the cylindrical portion 13.

The male member 2 comprises a tappet 60 that acts on the shut-off valve 50. The tappet 60 has a structure similar to the structure of the support 54. The tappet 60 comprises at least one, for example three, arms 61 and an abutment surface 62, here formed by a central pin 63. The abutment surface 62 is normal to the axis of the coupling 1. The arm(s) 61 extend radially between the pin 63 and the bore of the cylindrical portion 3. The tappet 60 is of a single piece with the cylindrical portion 3.

The arm(s) 61 leave free a fluid passage in the axial direction. The abutment surface 62 of the tappet 60 is axially positioned in such a way that, in the position shown in FIGS. 2, 3 and 7 corresponding to connected fixed and removable reservoirs, the shut-off valve 50 are opened by bearing on the abutment surface 62 on the collar 58 on the side opposite the spring 57. The circular shutter 51 is then separate from the seat 52.

During the dismounting of the removable reservoir, the male member 2 is withdrawn via an axial movement that separates the radial portion 4 and the radial portion 14. The shut-off valve 50 accompanies said axial movement until the shut-off valve 50 is stopped by the seat 52. The abutment surface 62 is then separated from the collar 58. The shut-off valve 50 is closed before the exit of the male member 2 outside the female member 7, more precisely before the exit of the O-ring from the groove 6 outside the bore of the cylindrical portion 13. The spring 57 remains prestressed in order to provide good blocking off.

In the opposite direction, the male member 2 is inserted into the female member 7. The O-ring of the groove 6 comes in the bore of the cylindrical portion 13 and provides the seal. Then, the tappet 60 comes into contact with the shut-off valve 50. More precisely, the abutment surface 62 pushes the collar 58, resulting in the displacement of the shut-off valve 50 with the male member 2, the compression of the spring 57 and the opening of the fluid passage. In this axial position shown in FIGS. 2, 3 and 7, the locking member 40 can be manoeuvred by rotation towards the locked position, providing the stable connection between the fixed and removable reservoirs.

Thus, the coupling 1 comprises a shut-off valve 50 with manoeuvring that is mechanically indexed on the relative position of the male and female members. The shut-off valve 50 is capable of closing off one of the reservoirs automatically upon disconnection. The operator does not have to perform an additional step of closing off.

The invention is not limited to the examples of the method and apparatus described hereinabove, only as an example, but it encompasses all the alternatives that can be considered by those skilled in the art within the scope of the claims hereinafter.

The invention claimed is:

1. A quick coupling device for transferring liquid for an aircraft, comprising:
a female member configured to be connected to a first reservoir, said female member forming a passage and comprising a cylindrical portion and a radial portion,
a male member configured to be connected to a second reservoir, said male member forming a passage, slidably mounted in a liquid-tight manner in the female member and comprising a cylindrical portion and a radial portion, and
a member for locking the male member in the female member,
the locking member being disposed between the radial portion of the female member and the radial portion of the male member,
the locking member surrounding the male member and leaving a limited sliding extent for the male member with respect to the female member, engaging with the female member in the locked position and releasing the female member in the unlocked position,
the locking member comprising an axial blocking lock that can be actuated by an axial then rotating movement and that can be released by an axial then rotating movement, and a rotation brake, the lock and the brake being active in the locked position,
wherein the female member comprises two concentric rings integral with the radial portion of the female member, the first ring being provided with a plurality of L-shaped grooves configured to cooperate with the lock, the second ring being provided with a first concavity extending axially over the height of said second ring for the engagement of the brake and of a second concavity angularly offset with respect to the first concavity and configured to cooperate with the brake in the locked position.

2. The device according to claim 1, wherein each L-shaped groove comprises an axial portion arranged on a portion of the thickness of the first ring, an angular portion arranged on a limited angular sector of the first ring, and a projection directed towards the radial portion of the female member, in the vicinity of the axial portion and delimiting the locked position of the lock.

3. The device according to claim 1, wherein the L-shaped grooves are disposed angularly in an irregular manner.

4. The device according to claim 1, wherein one of the rings is external and provided with radial openings in the vicinity of the radial portion of the female member.

5. The device according to claim 1, wherein an axial-effect spring of a generally annular shape is disposed between said concentric rings to exert an axial prestress on the locking member in the locked position.

6. The device according to claim 5, wherein said spring is undulated and comprises several windings.

7. The device according to claim 1, wherein the locking member comprises an axial skirt supporting the axial blocking lock and the axial blocking lock comprises a plurality of teeth directed towards the female member, the teeth being concentric, each tooth forming an angular sector and having edges that are part of parallel planes.

8. The device according to claim 1, wherein the locking member is made from at least two portions.

9. The device according to claim 1, wherein the brake comprises a spring, annular or as an arc of a circle, having a boss directed radially outwards and configured to interfere with the female member, more particularly with a concavity arranged in the female member.

* * * * *